Patented June 29, 1948

2,444,346

UNITED STATES PATENT OFFICE 2,444,346

RECOVERY OF NORDIHYDROGUAIARETIC ACID FROM PLANT EXTRACTS

Ole Gisvold, Minneapolis, Minn., assignor to Regents of The University of Minnesota, Minneapolis, Minn., a corporation of Minnesota No Drawing. Application January 5, 1946, Serial No. 639,433

7 Claims. (Cl. 260—619)

This invention relates to the preparation of relatively pure extracts of plants of the species *Larrea divaricata*, suitable for use in pharmaceuticals and foods. Plants of the species *Larrea divaricata* are sometimes also known as *Larrea tridentata* or *Covillea tridentata*, and are commonly known in the United States as "creosote bush." The term *Larrea divaricata* will be used herein.

This application is a continuation-in-part of my copending application Ser. No. 573,311 filed January 17, 1945, now Patent No. 2,408,924, granted October 8, 1946.

It has been discovered that plants of the species *Larrea divaricata* contain nordihydroguaiaretic acid, a compound of phenolic nature, having the empirical formula $C_{18}H_{22}O_4$ and the structure:

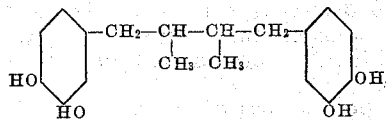

According to the Geneva nomenclature, nordihydroguaiaretic acid may be designated beta, gamma-dimethyl, alpha delta-bis (3,4-dihydroxyphenyl) butane. The melting point of this material is 183–184° C.

In addition to nordihydroguaiaretic acid, plant material of the species *Larrea divaricata* also appears to contain other phenolic constituents, rubber-like substances, pigments, cellulose and various other complexes, which are undesirable contaminants insofar as concerns many uses of the nordihydroguaiaretic acid component, although some of such other constituents are in themselves useful.

It is an object of the invention to provide a convenient efficient method of separating the constituents of natural plant material of the species *Larrea divaricata*, and a particular object to provide methods of making extracts having a high concentration of nordihydroguaiaretic acid.

The present invention involves an improvement on previous methods of extraction and purification and results in the isolation of substantially pure nordihydroguaiaretic acid in good yields and with a minimum of processing.

In general the invention comprises the preparation of a crude extract of nordihydroguaiaretic acid from a suitable source material such as the plant *Larrea divaricata*, which crude extract is then purified to yield crystalline nordihydroguaiaretic acid in accordance with a special procedure outlined in further detail hereinafter.

The crude extract may be prepared by any suitable procedure. I prefer, however, to employ one of the processes outlined in my copending applications Ser. No. 478,321 filed March 6, 1943, now U. S. Patent No. 2,421,117, granted May 27, 1947, and Ser. No. 490,149, filed June 9, 1943, now Patent No. 2,382,475. According to the first mentioned application the crude extract may be prepared as follows:

The plant material consisting of small twigs, leaves, stems, flowering tops, some seed, or the whole plant, if desired, is dried either by air drying or artificial drying. Foreign material such as adherent dirt and the like is removed and the plant material is then preferably, though not necessarily, ground in any suitable mill, such as a hammer mill, a Jacobson mill, or the like, until a fine powder results. Grinding can be accomplished without difficulty, and the powder is fairly dense. The size of grinding is preferably 10 to 100 mesh, 20 to 80 mesh being suitable for most efficient extraction. The powder is yellowish-green in color and has an odor which is not unpleasant when dilute, but is somewhat disagreeable when concentrated. The powdered material may be stored in tightly closed tins for a period of weeks without appreciable deterioration. The whole plant may, if desired, be extracted but for the most efficient and thorough utilization of the raw material it should be ground to a powder.

The plant material is then extracted preferably by percolation or continuous extraction with a solvent capable of extracting the resinous constituents of the plant material. The suitability of any prospective solvent may be gauged by testing an extract solution made with the solvent in question for the color reactions characteristic of catechol using a ferric chloride test solution (known in the pharmacopoeia as ferric chloride T. S.) in the presence of an aqueous solution of sodium carbonate test solution. Thus to determine the suitability of a prospective solvent, one may make a test extraction and then to the solvent extract add a small quantity of ferric chloride T. S. in accordance with the usual technique for testing for the color reactions characteristic of catechol. Where the desired plant fractions are present, they are revealed even in very dilute strengths. Thus, a small drop of plant extract may be diluted to 15 to 20 cc. with methyl alcohol and this is used for the color tests.

It may be explained that the characteristic green-blue-violet color changes characteristic of catechol may not be very distinct when ferric chloride T. S. alone is used, and so as to bring out the color reactions (and thus make the test more certain) there is added a dilute, preferably freshly prepared, solution of sodium carbonate. This is added drop by drop to the color test solution after ferric chloride T. S. is added. Where the plant extract solvent in question is suitable for the extraction, the much diluted sample of extract solution will be fairly clear and only slightly tinged, a faint olive upon addition of ferric chloride T. S. Upon addition of sodium carbonate, drop by drop, the color changes to an emerald green (a critical color phase, easily passed). As more sodium carbonate is added, the color changes through to a deep blue-green to blue, blue-violet and finally deep violet-red (wine) color. Where the prospective plant extraction solvent is not suitable, these characteristic reactions do not occur.

The solvent may thus be characterized as one capable of yielding an extract of Larrea divaricata giving the color reactions characteristic of catechol using ferric chloride T. S. (10% aqueous ferric chloride solution) in the presence of sodium carbonate (1% freshly prepared aqueous sodium carbonate solution).

Exemplary suitable solvents are in general organic solvents containing a halogen, oxygen or nitrogen in the molecular structure or mixtures of these solvents. Thus, oxygen containing organic solvents such as the alkyl ethers, notably ethyl ether, isopropyl ether, butyl ether, and the like, cyclic ethers such as dioxane or a ketone such as acetone, may be used. Other oxygen containing organic solvents are the alcohols, such as methyl, ethyl propyl, amyl, isopropyl and isoamyl alcohols or the glycols, such as propylene glycol; alkyl esters, such as ethyl acetate, or other low boiling acetates; acids such as glacial acetic acid, all are suitable. Likewise the halogen containing organic solvents such as chloroform, dichloromethane, methylene dichloride, ethylene dichloride and ethylene dibromide may be used. Similarly the nitrogen containing organic solvents such as pyridine and "morpholine," nitro-methane, nitro-ethane and nitro-propane may be used. Ethyl ether is preferred where suitable equipment is available.

Some of the foregoing solvents are more efficacious than others and widely different extraction periods are therefore necessary. Thus, when using di-ethyl ether, the extraction is as complete as necessary for practical purposes in 1½ hours to 4 hours, whereas some of the halogenated solvents, chloroform, ethylene dichloride and the like, require from 8 hours to a day or more for extraction.

The extract is then filtered to remove the extraneous material and the solvent is partially or completely removed by evaporation or distillation. The solvent removal step, the temperatures of distillation or evaporation, and other details depend upon the characteristics of the particular solvent used and are obvious once the solvent has been selected as hereinbefore taught. Thus where ethyl ether is used, simple distillation or evaporation is sufficient for its removal. For economy, the solvent should be recovered.

After removal of all or nearly all of the solvent there remains a dark, yellowish-brown, tarry mass which is designated herein as the "crude" or "primary" extract. This extract contains substantial amounts of nordihydroguaiaretic acid (probably 25–35%), and some fats, waxes, rubber-like materials, pigments, some of which are flavone-like materials, and other fractions. It may be pointed out at this juncture that there is no accurate method available for the quantitative determination of nordihydroguaiaretic acid, and the content is therefore judged from the amount of crystalline nordihydroguaiaretic acid recovered, as hereinafter described from a given quantity of the primary extract.

According to the later application referred to above the crude extract may be prepared as follows:

There may be utilized the whole plant, including the entire woody portions, leaves, stems, flowers and buds. The plant material may be used either in the dried or green states, the lattere being preferred. The plant material is preferably not ground, although chopped or packed plant material may be used for convenience in handling.

The plant material is extracted with an aqueous solution of alkali hydroxide such as sodium hydroxide, potassium hydroxide or with ammonium hydroxide. Sodium and potassium hydroxides are preferred because of their excellent extractive ability, low cost and availability. The aqueous hydroxide solution may be used either weak or strong, preferably a concentration of from 2 to 10%, and to the aqueous solution there is added a reducing agent, preferably sodium hydrosulfite, the percentage of the latter being about half of the percentage of the hydroxide, viz. 1–5%, although this is not critical. The reducing agent serves to protect the ortho hydroquinone nuclei of the nordihydroguaiaretic acid from oxidation during the alkali extraction. Sodium hydrosulfite serves admirably for this purpose but other reducing agents of equivalent strength, capable of reducing orthoquinones to the corresponding orthohydroquinones under alkaline conditions, may be used. The extraction is made at room temperature, viz. 15–25° C. although slightly elevated temperatures are not harmful.

Extraction is carried out by leaching or percolation, and is usually complete in from 15 minutes to 1 hour. If desired, the extraction may be carried out by a counter-current procedure in a number of vessels, the aqueous hydroxide-reducing agent solution being removed from the first vessel and conveyed onto the plant material of the second vessel after a few minutes extraction in the first vessel. Thereafter, a fresh sodium hydroxide-reducing agent solution is conveyed to the first vessel and after a suitable interval the leaching solution of the second vessel is removed and conveyed into a third vessel containing fresh plant material while the aqueous hydroxide-reducing agent solution is likewise conveyed from the first vessel to the second vessel. This may be repeated through any number of vessels, the aqueous hydroxide-reducing agent solution being permitted to remain in each vessel for a short time, after which it is removed and conveyed to the next succeeding vessel in the series. After from 2 to 4 leachings of the plant material in the first vessel, the extraction of the plant material therein is complete and it is removed and discarded whereupon fresh plant material is placed in this vessel and it becomes the last in the series. By this counterflow procedure, efficient use may be made of the aqueous hydroxide-reducing agent solution.

The leaching liquid containing the extracted material is then acidulated with any suitable inorganic or organic acid, hydrochloric, sulfuric and glacial acetic acids being exemplary. It is desired that the acidulation be carried to the point at which a flocculation appears in the extraction solution, at which point the solution is just neutral or a trifle basic when tested with litmus. In the event too much acid is added, a considerable precipitation will occur but there still remains an appreciable dispersion of colloidal particles. However, no harm is done by over acidulation, and should such be encountered, it is only necessary to add a dilute alkali solution to decrease the acidity slowly until the flocculation again appears. At the flocculation stage, there still remains in the extraction liquor a considerable amount of suspended matter which imparts to the liquor a somewhat cloudy appearance. However, the flocculent precipitate represents a good portion of the desired constituents and this settles out after standing for 12 hours or more. Due to consideration of cost of raw material, it is usually unnecessary to recover the suspended matter in the extraction liquor but this may be recovered and used if desired.

The aqueous extraction solution, neutralized as indicated, may also be treated by centrifuging in order to facilitate separation of the flocculent precipitate. Also, under some conditions, a fairly tough curd develops and agglomerates. Where settling is used, a longer period of settling, as for example a week or more, causes the flocculent precipitate to settle in a fairly solid mass and this is desirable since it is useful to remove as large an amount of water as is possible at this stage.

Crude extracts thus prepared or prepared by other procedures which result in crude extracts of the same type, can then be further processed in accordance with the following method:

A solution of crude nordihydroguaiaretic acid together with accompanying impurities is prepared by dissolving the crude material in any suitable organic solvent. As the solvent for the crude extract at this stage, I prefer to use ethyl ether or isopropyl ether, although other ethers such as beta, beta dichlor-diethyl ether or di-chlor-dimethyl ether serve almost as well, and being less volatile present less fire hazard. These latter ethers are, however, much more expensive. The solution of crude extract thus obtained is then treated with an alkaline material, such as sodium carbonate, in a finely divided solid form, or where the solution of crude extract is immiscible in water it may be treated with an aqueous solution of the alkaline material. The treatment with the alkaline material may be conducted in any suitable manner as by suspending and agitating the solid alkaline material in the solution of crude extract for a short period of time followed by separating the solid from the solution. As an alternative the solution of crude extract may be passed through a column of the solid, preferably mixed with an inert agent such as filter cell.

The treatment with an aqueous solution of the alkaline material may be effected in any usual manner of contacting immiscible liquids after the proper time of treatment, the two liquids separate as distinct phases and one can be removed from the other.

The alkaline material removes pigment impurities present in the crude extract, some of which at least might find their way into the final product were it not for this treatment. The treatment is highly efficacious and results in a product far superior to those heretofore available and at the same time involves a minimum of processing. High yields of a high purity product are obtained.

After treatment with the alkaline material the solution of crude extract is concentrated by distillation (preferably under vacuum) to remove most, if not all the solvent and then mixed with a quantity of a halogenated hydrocarbon to form a homogeneous solution. The removal of the original solvent may be accomplished in any of a number of suitable ways. For example, where the original solvent is more volatile than the halogenated hydrocarbon, it may be removed by simple distillation. Where the original solvent is water miscible it may be removed by washing with water. Other suitable methods of removing the original solvent will be apparent to those skilled in the art. The solution of nordihydroguaiaretic acid in halogenated hydrocarbon remaining after the removal of the original solvent is then concentrated to a small volume at which point it has the consistency of a thin syrup. The mixture is cooled and stirred, and crystallization begins. The crystallization of nordihydroguaiaretic acid usually occurs in a few minutes but may require 24–48 hours to be complete. The semi-solid crystalline mass is composed of crystallized nordihydroguaiaretic acid and dissolved impurities, principally phenolics, and a small amount of halogenated hydrocarbon. The semi-solid mass is then treated with a small quantity of preferably hot halogenated hydrocarbon, thoroughly stirred and rapidly filtered, as on a suction filter. The crystalline mass on the filter may then be washed repeatedly with small volumes of hot halogenated hydrocarbon to leave a residue of substantially pure nordihydroguaiaretic acid in a good yield.

The following specific examples, which are not to be construed as limiting, will serve to illustrate the invention:

*Example I*

A primary extract from 200 grams of drug, made with sodium hydroxide and sodium hydrosulfite in accordance with my preceding application Serial No. 490,149, now Patent No. 2,382,475, was covered with 150 cc. of isopropyl ether. This mixture was stirred vigorously for about 10 minutes. If the primary extract has not been thoroughly acidulated in its preparation, 1 to 3 cc. of 50% strength commercial hypophosphorus acid can be added to this mixture for its protecting effect upon nordihydroguaiaretic acid. The supernatant liquid was decanted and the residue treated with a second 150 cc. portion of isopropyl ether as described above. The two portions of solvent were combined, treated with 60 grams of finely divided solid sodium carbonate and the mixture stirred rapidly for a few minutes. This step removes some resinous material and the pigments that have a tendency subsequently to crystalilze with the nordihydroguaiaretic acid. The ether solution was then decanted. The highly colored sodium carbonate was washed with two 25 cc. portions of isopropyl ether. These washings were combined with the original ether solution and then stirred vigorously with 2 or 3 grams of sodium hydrosulfite (powdered). The mixture was filtered and the filtrate concentrated under a vacuum until the mixture was the consistency of a thin syrup containing about 5 to 10 cc. of ether. 10 to 75 cc. of ethylene dichloride were then added and the mixture heated on the steam bath until the extract had a consistency of a thin syrup. At this point the ether had been removed and about 5 cc. of ethylene dichloride remained. The extract was then cooled and stirred. Crystallization of nordihydroguaiaretic acid took place in a few minutes. The mass was allowed to stand several hours to insure complete crystallization of the nordihydroguaiaretic acid. The mass was then gently warmed on the steam bath and 5 to 10 cc. of warm ethylene dichloride were added and the mixture thoroughly stirred. The mixture was then filtered by means of suction and the crystalline material washed with successive portions 5 cc. each of hot ethylene dichloride (total 25–50 cc.). The nordihydroguaiaretic acid that remained on the filter paper was finely crystalline, light in color, and of excellent quality.

*Example II*

A primary extract from 200 grams of drug, made with sodium hydroxide and sodium hydrosulfite in accordance with my preceding application Serial No. 490,149, now Patent No. 2,382,475, was covered with 150 cc. of isopropyl ether. This mixture was stirred vigorously for about 10 minutes. If the primary extract has not been thoroughly acidulated in its preparation, 1 to 3 cc. of 50% strength commercial hypophosphorus acid can be added to this mixture for its protecting effect upon nordihydroguaiaretic acid. The supernatant liquid was decanted and the residue treated with a second 150 cc. portion of isopropyl ether as described above. The combined ether extractions were shaken with two 200 cc. portions of 5% sodium carbonate containing 2½% sodium hydrosulfite to remove certain resinous material and pigments that have a tendency subsequently to crystallize with the nordihydroguaiaretic acid. The sodium carbonate washings were washed once with 25 cc. of isopropyl ether. This was combined with the above ether solution and the combined solutions washed once with 20 cc. of water and once with 20 cc. of 5% hypophosphorus acid. The two portions of solvent were combined, filtered and concentrated under a vacuum until the mixture was the consistency of a thin syrup containing about 5 to 10 cc. of ether. 10 to 75 cc. of ethylene dichloride were then added and the mixture heated on the steam bath until the extract had a consistency of a thin syrup. At this point the ether had been removed and about 5 cc. of ethylene dichloride remained. The extract was then cooled and stirred. Crystallization of nordihydroguaiaretic acid took place in a few minutes. The mass was allowed to stand several hours to insure complete crystallization of the nordihydroguaiaretic acid. The mass was then gently warmed on the steam bath and 5 to 10 cc. of warm ethylene dichloride were added and the mixture thoroughly stirred. The mixture was then filtered by means of suction and the crystalline material washed with successive portions 5 cc. each of hot ethylene dichloride (total 25–50 cc.). The nordihydroguaiaretic acid that remained on the filter paper was finely crystalline, light in color, and of excellent quality. Yield, 5%.

A peculiar phenomenon appears to be involved in the process of this invention. When it is attempted to crystallize nordihydroguaiaretic acid from a solution of it and ordinarily occurring impurities in an ordinary solvent such as alcohol or ether, no crystallization occurs, but rather the whole mass appears to solidify to an amorphous somewhat plastic body and no separation of the nordihydroguaiaretic acid can be effected. When, however, the crude extract is transferred from its original solvent to the halogenated hydrocarbon solvent, and the solvent partly evaporated, a supersaturated solution appears to result from which the crystalline nordihydroguaiaretic acid can readily be isolated. Apparently the manner in which the supersaturated solution is prepared and the nature of the solvent employed affect the balance of the physical system such that a crystalline precipitate is obtained. Whatever the explanation of the phenomenon, it does occur and provides a simple and economical method of isolating nordihydroguaiaretic acid from a crude extract and involves a tremendous advance over the processes heretofore available for the isolation of this material.

The ether employed as a solvent for the crude extract before transference to the halogenated hydrocarbon may be any of a variety of lower aliphatic ethers, preferably not higher than butyl ether. Thus, ethyl ether, n-propyl ether, isopropyl ether or butyl ether may be used. Similarly mixed ethers may be used.

A variety of alkaline materials may be employed for removal of resinous materals and pigments. Thus, sodium or potassium carbonates, aluminates and silicates or mixtures thereof or alkali metal salts of similar degree of alkalinity are suitable.

Apparently any halogenated lower aliphatic hydrocarbon which is miscible with the ether solution of the crude extract may be used as the solvent from which the nordihydroguaiaretic acid is crystallized. Chloroform, propylene dichloride, methylene dichloride and ethylene dichloride are particularly suited and of these, ethylene dichloride appears to possess characteristics best suited for this purpose.

The filtrate containing halogenated solvent and halogenated solvent washings may be collected, combined and concentrated to yield a second crop of nordihydroguaiaretic acid. This procedure may be repeated until no more crystals are obtained. These crops are of lesser purity, ranging from ecru to pale yellow in color, but are suitable for many purposes where a high degree of purity and white color are not essential.

It will be apparent that numerous variations may be made within the scope of the invention without departing from the spirit thereof. For example, time periods, temperatures, amounts of solvents and the like, may be varied from those specifically set forth in the specific examples. It is to be understood therefore that the invention is to be limited only by the appended claims.

What I claim is:

1. Process of separating nordihydroguaiaretic acid from a crude extract containing nordihydroguaiaretic acid and impurities dissolved in a lower aliphatic ether solvent therefor, which comprises contacting the resultant solution with an alkaline material having an alkalinity within the approximate range of that of the alkali metal carbonates, aluminates and silicates, separating the alkaline material from the solution, adding a halogenated lower aliphatic hydrocarbon solvent which is miscible with said ether solution, removing said ether solvent and part of said halogenated hydrocarbon solvent, and crystallizing nordihydroguaiaretic acid from the halogenated hydrocarbon.

2. Process of separating nordihydroguaiaretic acid from a crude extract containing nordihydroguaiaretic acid and impurities dissolved in a lower aliphatic ether solvent therefor, which comprises contacting the resultant solution with a finely divided solid alkaline material having an alkalinity within the approximate range of that of the alkali metal carbonates, aluminates and silicates, separating the alkaline material from the solution, adding a halogenated lower aliphatic hydrocarbon solvent which is miscible with said ether solution, removing said ether solvent and part of said halogenated hydrocarbon solvent, and crystallizing nordihydroguaiaretic acid from the remaining halogenated hydrocarbon.

3. Process of separating nordihydroguaiaretic acid from a crude extract containing nordihydroguaiaretic acid and impurities dissolved in a lower aliphatic ether solvent therefor, which comprises contacting the resultant solution with an aqueous solution of an alkaline material having an alkalinity within the approximate range of that of the alkali metal carbonates, aluminates and silicates, separating the alkaline material from the solution, adding a halogenated lower aliphatic hydrocarbon solvent which is miscible with said ether solution, removing said ether solvent and part of said halogenated hydrocarbon solvent, and crystallizing nordihydroguaiaretic acid from the remaining halogenated hydrocarbon.

4. Process of separating nordihydroguaiaretic acid from a crude extract containing nordihydroguaiaretic acid and impurities dissolved in a lower aliphatic ether solvent therefor, which comprises contacting the resultant solution with a finely divided solid alkali metal carbonate, separating the alkali metal carbonate from the solution, adding a halogenated lower aliphatic hydrocarbon solvent which is miscible with said ether solution, removing said ether solvent and part of said halogenated hydrocarbon solvent and crystallizing nordihydroguaiaretic acid from the remaining halogenated hydrocarbon.

5. Process of separating nordihydroguaiaretic acid from a crude extract containing nordihydroguaiaretic acid and impurities dissolved in a lower aliphatic ether solvent therefor, which comprises contacting the resultant solution with an aqueous solution of alkali metal carbonate, separating the alkali metal carbonate from the solution, adding a halogenated lower aliphatic hydrocarbon solvent which is miscible with said ether solution, removing said ether solvent and part of said halogenated hydrocarbon solvent and crystallizing nordihydroguaiaretic acid from the remaining halogenated hydrocarbon.

6. Process of separating nordihydroguaiaretic acid from a crude extract containing nordihydroguaiaretic acid and impurities dissolved in a lower aliphatic ether solvent therefor, which comprises contacting the resultant solution with a finely divided alkali metal aluminate, separating the alkali metal aluminate from the solution, adding a halogenated lower aliphatic hydrocarbon solvent which is miscible with said ether solution, removing said ether solvent and part of said halogenated hydrocarbon solvent and crystallizing nordihydroguaiaretic acid from the remaining halogenated hydrocarbon.

7. Process of separating nordihydroguaiaretic acid from a crude extract containing nordihydroguaiaretic acid impurities dissolved in a lower aliphatic ether solvent therefor, which comprises contacting the resultant solution with a finely divided alkali metal silicate, separating the alkali metal silicate from the solution, adding a halogenated lower aliphatic hydrocarbon solvent which is miscible with said ether solution, removing said ether solvent and part of said halogenated hydrocarbon solvent and crystallizing nordihydroguaiaretic acid from the remaining halogenated hydrocarbon.

OLE GISVOLD.

REFERENCES CITED

The following references are of record in the file of this patent:

UNITED STATES PATENTS

| Number | Name | Date |
| --- | --- | --- |
| 1,595,604 | Heffner | Aug. 10, 1926 |
| 1,986,320 | Burdick | Jan. 1, 1935 |
| 2,043,102 | Kester | June 2, 1936 |
| 2,296,952 | Ross | Sept. 29, 1942 |
| 2,382,475 | Gisvold | Aug. 14, 1945 |